Patented July 27, 1948

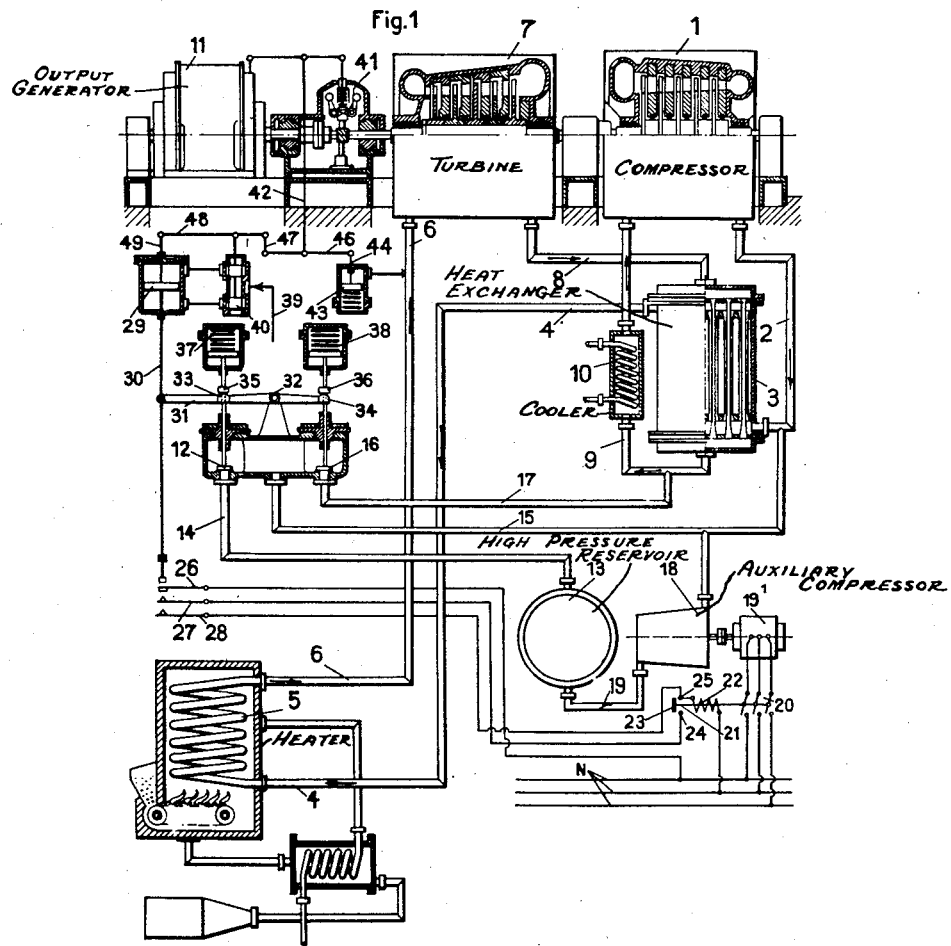

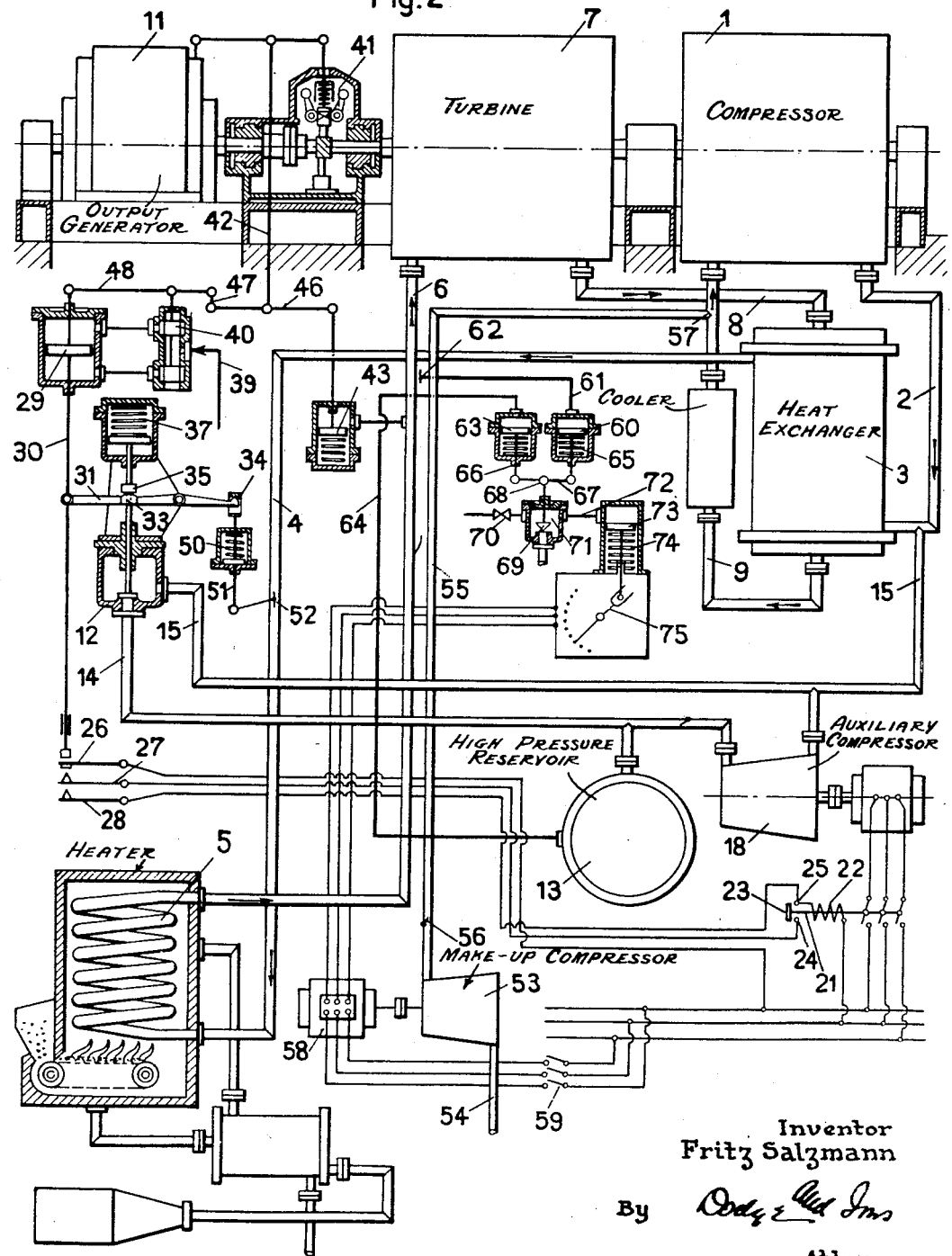

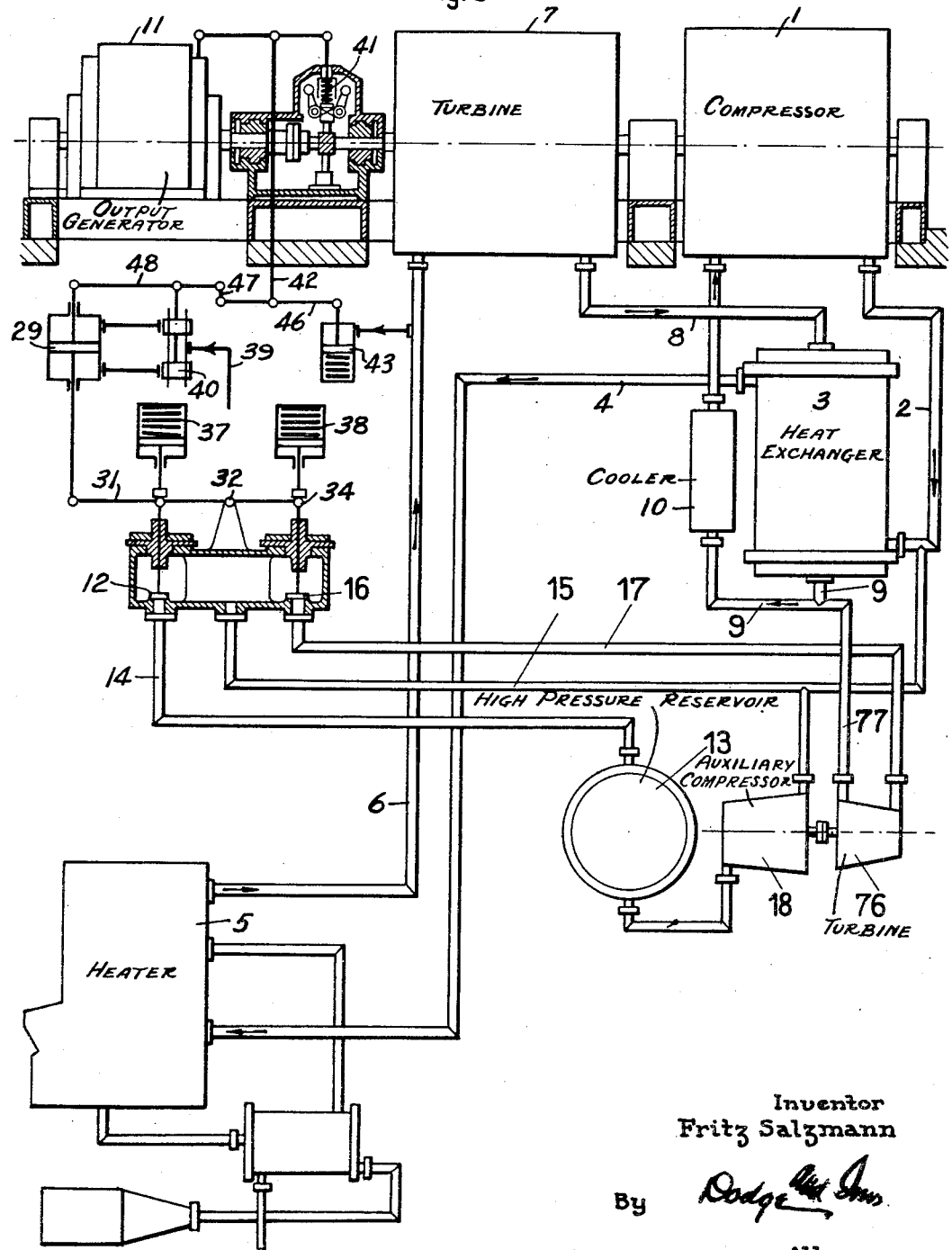

2,446,108

UNITED STATES PATENT OFFICE 2,446,108

POWER PLANT WORKING WITH A HOT GASEOUS MEDIUM

Fritz Salzmann, Zurich, Switzerland, assignor to Aktiengesellschaft Fuer Technische Studien, Zurich, Switzerland, a corporation of Switzerland Application March 7, 1945, Serial No. 581,493
In Switzerland February 27, 1942

Section 1, Public Law 690, August 8, 1946
Patent expires February 27, 1962

8 Claims. (Cl. 60—59)

1

This invention relates to a method for the regulation of the output of thermal power plants in which at least the greater part of a gaseous working medium, preferably air, describes a cycle and in which on an increase in the load taking place, the level of pressure in the cycle is raised by supplying thereto working medium of higher pressure from a reservoir, whilst, on a drop in the load on the plant taking place, the level of pressure in the cycle is lowered by withdrawing working medium therefrom.

The object of the present invention is to provide a method as also an arrangement for carrying out this method according to which working medium can be withdrawn from the cycle in such a manner as to involve only the smallest possible losses of energy. According to the present invention this advantage is secured by withdrawing from the cycle when the pressure level in the latter is too high compared with the useful load momentarily taken off the plant, working medium at a point where as high a pressure as possible prevails and by supplying such medium, after it has been compressed, to the high pressure reservoir. If the pressure in this reservoir should not suffice to permit of the cycle being charged for the maximum load that is required at any time, working medium can be withdrawn from the cycle at said point where as high a pressure as possible prevails and, after compression, supplied to said reservoir until the required pressure in the latter is established. Hereby the working medium withdrawn from the cycle can be replaced by working medium taken from an external source and introduced into the cycle at a point where as low a pressure as possible prevails. The arrangement for carrying out the method according to this invention comprises an auxiliary compressor influenced by the pressure prevailing in the cycle and by the speed of the plant, which forces working medium withdrawn from the cycle into the high pressure reservoir. This auxiliary compressor can also be used for acting on the working medium which is needed for maintaining the required pressure in the high pressure reservoir.

Three constructional forms of arrangements for carrying out the new method are shown by way of example in the accompanying drawings in a partially simplified mode of representation.

Fig. 1 shows a plant the useful output of which can be regulated by changing the level of pressure in the cycle described by the working medium, as also with the aid of a short circuit current connecting two points of this cycle at which different pressures prevail.

2

Fig. 2 shows a plant in which an additional compressor supplies air inhaled from the atmosphere to a low pressure point of the cycle described by the working medium.

Fig. 3 shows a modification of a detail.

In the plant illustrated in Fig. 1 the working medium passes through a compressor 1, a pipe 2, a heat exchanger 3, a pipe 4, a heater 5 in which heat is supplied to the working medium from an external source, a pipe 6, a turbine 7 giving up the required output, a pipe 8, then again through said heat exchanger 3, further through a pipe 9 and a cooler 10, after which it finally again reaches the compressor 1. The useful output developed by the turbine 7, which likewise drives the compressor 1, is given up to a generator 11. A valve 12 controls the passage of working medium from a high pressure reservoir 13 through pipes 14 and 15 into the pipe 2 constituting a part of the cycle through which the working medium passes. A valve 16, on the other hand, controls a short circuit current flowing through pipes 15 and 17 from a higher pressure point of the cycle (pipe 2) to a lower pressure point of the latter (pipe 9). The numeral 18 denotes an auxiliary compressor which can inhale working medium from the pipe 15 connected to the high-pressure part of the cycle and supplies same to the high pressure reservoir 13, whereby a non-return valve 19 prevents any return flow of working medium from the reservoir 13 into the auxiliary compressor 18. The latter is driven by an electric motor $19^1$, which receives current through a switch 20 controlled by a relay 21 with coil 22, a disc 23 and contacts 24, 25. The current for influencing the relay 21 is controlled by contact springs 26, 27 and 28, the respective positions of which are determined in their turn by the position of a servomotor piston 29 and by a rod 30 made in one part with the latter. The servomotor 29 serves at the same time for operating the valves 12 and 16 in that it is connected to a beam 31 turning about a fulcrum 32 and having two cams 33, 34. To the cam 33 an adjusting ring 35 of the rod of valve 12 is coordinated and to the cam 34 an adjusting ring 36 of the rod of valve 16. The cam 33 can, on reaching the adjusting ring 35, raise valve 12 against the action of a spring 37, whilst the cam 34 can, on reaching the adjusting ring 36, raise valve 16 against the action of a spring 38. The servomotor piston 29 is moved by oil under pressure supplied through a pipe 39, the admission to the chambers on either side of piston 29 being regulated by a control valve 40. The latter is influenced simultaneously both by the position of a centrifugal governor 41, allotted to the machines 7 and 1, as also by the pressure prevailing in pipe 6. This pressure acts on a piston 43, connected by rod 44 to a beam 46 and with which the centrifugal governor 41 is also operatively connected by a rod 42. The numeral 47 denotes a link which is connected both to the beam 46 as also to a beam 48; the latter is further connected to the control valve 40 and through a rod 49 to the piston 29.

The different arrangements for regulating the output of the thermal power plant described with reference to Fig. 1 work as follows:

When the load on generator 11 increases, the speed of the plant is reduced, so that centrifugal governor 41 moves rod 42 downwards, whereby control valve 40 is moved in the corresponding sense, so that oil under pressure can now gain access to the lower side of piston 29, thus causing same to move upwards. The valve 12 is raised thus allowing working medium to flow from the high pressure reservoir 13 through pipes 14 and 15 into the cycle, as a result of which the level of pressure in the latter is raised and in conjunction therewith the useful output developed by the plant increased. The control valve 40 is brought back to its previous position under the influence of the increased pressure prevailing in pipe 6 of the cycle, since piston 43 is now moved downwards and, as a consequence, beam 46 swung clockwise around the point where rod 42 is connected to this beam. A new state of equilibrium with a lower speed, corresponding to the increase in load, is therefore brought about.

A drop in the load on the generator 11 and a corresponding increase in the speed of the machines 7 and 1 causes on the other hand an opposite movement of the different control rods so that the servomotor piston 29 moves downwards. The lower end of piston rod 30 after having passed through a distance of adjustable extent, forces the contact spring 26 against the contact spring 27, which for the time being does not bring about any further action, and then, after having passed through a further distance, forces the spring 27 against the contact spring 28, whereby a circuit from network N through the springs 26, 28 and coil 22 is closed. As a consequence, the relay 21 is operated and switch 20 closed, so that the auxiliary compressor 18 is started up and working medium withdrawn from the cycle through pipe 15 is supplied to the high pressure reservoir 13. As a consequence of this, the pressure in the cycle is lowered, so that the output developed by the plant is likewise reduced. The falling pressure in pipe 6 causes an upward movement of the piston 43 and therefore a restoring of the control mechanism.

During the backwards, i. e. upwards movement of the rod 30 the supply of current to the motor 19¹ driving the auxiliary compressor 18 is again interrupted, but, however, only after the contact spring 26 no longer touches contact spring 27, since the relay 21 which came into action beforehand, closes up to said moment the circuit through coil 22 via the contacts 24, 25. On the other hand, when spring 26 moves away from spring 27, this circuit is also interrupted, whereby the relay 21 moves back and switch 20 opens.

Since an auxiliary compressor 18 of moderate dimensions would not be capable of dealing with rapid fluctuations in the load on the plant, the valve 16 controlling a short circuit or by-pass current of working medium is provided to bring about rapid load adjustments. When load is taken off the generator 11, whereby the servomotor piston 29 and rod 30 move downwards in the manner described above, not only are the contact springs 26, 27, 28 operated by beam 31 and cam 35, but lifting of the valve 16 is also brought about, so that a short circuit current of working medium through the pipes 15 and 16 is given free, thus causing a reduction in the useful output of the plant. This short circuit current is not interrupted until the auxiliary compressor 18 has withdrawn such a quantity of working medium from the cycle, that the level of pressure prevailing therein corresponds to the reduced useful output now to be developed by the plant. Moreover it is also possible, when providing corresponding clearances between rod 30 and contact springs 26, 27, 28, as also between cam 34 and adjusting ring 36, to ensure that the auxiliary compressor 18 and valve 16 are operated in a given sequence, i. e. with intervening time laps.

The arrangement of the auxiliary compressor 18 between a point of the cycle, where as high a pressure as possible prevails, and the high pressure reservoir 13, ensures that the working medium to be withdrawn from the cycle can be returned to the reservoir 13 with the smallest possible consumption of compression energy. Notwithstanding the fact that the working medium acted upon by the auxiliary compressor 18 flows first through the low pressure section of the cycle and has to be compressed in the main compressor 1, the losses in energy resulting with the described arrangement of the auxiliary compressor 18 are still very small since the main compressor 1 will always effect the partial compression of said working medium at a better efficiency than an auxiliary compressor designed only for dealing with relatively small quantities of working medium. Apart from this, the auxiliary compressor 18 arranged in the manner described above can, in view of the extremely small pressure ratio with which it has to deal, be designed with very few pressure stages, which involves a minimum amount of material.

To compensate losses of working medium due to leakages occurring both in the cycle and in the pipes and regulating means connected therewith, an auxiliary device, operated by hand or automatically, can be provided by means of which the pressure reservoir can be charged without a direct supply of air from the atmosphere and this reservoir kept permanently ready for service even when leakage losses actually occur.

Fig. 2 shows a plant in which a rapid lowering of the useful output developed is not brought about by means regulating a short circuit or by-pass current of working medium, but by a throttle valve acting on the current describing the cycle and which can be arranged, in principle, at any point of the cycle. The means for operating the valve which allows medium to flow from the high pressure reservoir into the cycle as also the means for starting up the auxiliary compressor 18 are, in the case of this arrangement, for the greater part of the same design as for the arrangement shown in Fig. 1; they are therefore designated with the same reference numbers as in Fig. 1. However, in place of a valve, the cam 34 of the arrangement shown in Fig. 2 operates a rod 51 against the pressure of a spring 50. This rod 51 is connected to a throttle valve 52 arranged in pipe 4 which forms a part of the cycle described by the working medium, and on said rod 51 being lifted throttle valve 52 is operated in the closing sense.

The high pressure reservoir 13 must, as already mentioned, always contain such a quantity of working medium as to permit of the cycle being charged sufficiently to meet the required maximum output. The total working medium contained in the cycle and reservoir must, therefore, never be allowed to sink below a given minimum. If the working medium is air, this requirement can be met by the provision of a make-up compressor 53. This compressor 53 inhales air from the atmosphere through a pipe 54 and delivers same through pipe 55, provided with a non-return valve 56, to a point 57 of the cycle described by the working medium. The additional compressor 53 is driven by an electric motor 58. If the high-pressure reservoir 13 should not be sufficiently charged, a switch 59 controlling the supply of current to motor 58 can be closed by hand after which the compressor 53 forces working medium into the cycle in which the pressure now increases. The piston 43, the space above which is connected to pipe 6 of the closed cycle, is accordingly forced downwards thus causing an upward movement of the control valve 40, so that the servomotor piston 29 with rod 30 is moved downwards under oil pressure and the auxiliary compressor 18 brought into operation in the manner already described. Compressor 18 continues to operate until the quantity of working medium supplied to the cycle at point 57, less any possible losses in the cycle itself, has raised the pressure in reservoir 13 to the required level.

If the plant should not deliver its output to a network in which the frequency is maintained by machines connected in parallel, a rise of the pressure level in the cycle of the plant, due to a supply of working medium from an external source, will result in a larger output and therefore also in increased speed of the plant so that rod 42 will also be lifted which, as may be easily ascertained, finally likewise leads to starting up of the auxiliary compressor 18.

The working medium delivered by the make-up compressor 53 should, as shown, be supplied to the cycle at a point where the pressure is as low as possible, to ensure as large a part of the compression as possible being dealt with by the main compressor 1, thus permitting the dimensions of the additional compressor being reduced to a minimum.

Fig. 2 further illustrates a device for automatically regulating the air quantity delivered by the make-up compressor 53 and permitting the speed of this compressor being controlled in dependency on the pressure at a given point of a cycle and on the pressure in the reservoir 13, i. e. on pressures which for the greater part are directly proportionate to the corresponding quantities of working medium contained. This device comprises a piston 60. The space above this piston is connected by a pipe 61 to a point 62 of the cycle described by the working medium, whilst the space above a piston 63 is connected by a pipe 64 to the reservoir 13. The rods 65 and 66 which are allotted to the pistons 60 and 63 respectively, are linked to a beam 67 to which latter a throttle cone 69 is also linked at point 68. The cone 69 controls the discharge of pressure oil supplied to a chamber 71 through a pipe 70 fitted with a throttle member. The pressure prevailing in chamber 71 is transmitted through a pipe 72 to the upper end of a piston 73 which is kept in equilibrium by the action of a spring 74. The movements of piston 73 are transmitted to a device 75 having the form of an electrical resistance for changing the speed of the make-up compressor 53, this resistance 75 influencing the supply of current to the rotor of motor 58.

When a regulating action takes place, which does not involve any leakage losses or, at least, does not change the normal leakage losses, for example when only a transfer of working medium from the reservoir 13 into the cycle or vice versa takes place, one of the two pressures above pistons 60 and 63 will increase and the other decrease, as a result of which corresponding displacements of the two pistons will take place. If the fulcrum 68 is correctly disposed no displacement of the latter will take place in such a case.

On the other hand an increase in the leakage losses in the regulating device or in the reservoir involves a decrease in the corresponding pressure and thus causes an upward movement of one of the two pistons 60, 63 without the other piston moving downwards to a corresponding extent. The fulcrum 68 is consequently displaced in the upward direction, as a result of which the throttling cone 69 now frees a larger cross section for the discharge of oil so that the pressure in chamber 71 and therefore above the piston 73 drops. The latter is consequently moved upwards under the action of spring 74 and influences the speed governing device 75 in such a manner that the speed of the make-up compressor 53 increases. Consequently the quantity of working medium supplied by the latter to the cycle is likewise increased.

Alternatively, working medium directly compressed in the cycle and which after expansion is returned to said cycle at a point of lower pressure, may be employed for the drive of the auxiliary compressor. In particular, the by-pass current controlled by valve 16 indicated in Fig. 1 can be employed for this purpose. Such an arrangement is illustrated in Fig. 3 in which parts identical with components in Fig. 1 are given the same reference numerals used in Fig. 1. Now referring to the parts which are directly related to the modified construction, the numeral 13 again denotes the high pressure reservoir, whilst 15 and 17 denote pipes for a by-pass current; 16 is a valve controlling this by-pass current and 18 denotes the auxiliary compressor. In the case of this embodiment pipe 17 is connected to the inlet branch of an auxiliary air turbine 76, which drives the auxiliary compressor 18. The expanded air issuing from the auxiliary turbine 76 passes through a pipe 77 into pipe 9 of the main cycle described by the working medium of the plant; as already mentioned this pipe 9 belongs to the part of said cycle in which a low pressure prevails.

What is claimed is:

1. The method of regulating the output of a thermal power plant in which a gaseous working medium flows in a closed circuit in which heat is supplied to the working medium from an external source, the heated medium expands through a turbine while doing external work and is then recompressed preparatory to being again heated, whereby the circuit has a high pressure side and a low pressure side, which method comprises, maintaining a reserve of working medium under a pressure higher than that in said high pressure side; and varying the weight of working medium in the circuit to vary the pressure in the high pressure side in relation to the load on the plant, by establishing a flow path for working medium from said reserve to said high pressure side when the power generated in the plant is smaller than the momentary power to be delivered externally and withdrawing working medium from said high pressure side when the power generated in the plant is greater than the momentary power to be delivered externally; compressing said withdrawn medium to a higher pressure and delivering it to said reserve.

2. The method of regulating the output of a thermal power plant in which a gaseous working medium flows in a closed circuit in which heat is supplied to the working medium from an external source, the heated medium expands through a turbine while doing external work and is then recompressed preparatory to being again heated, whereby the circuit has a high pressure side and a low pressure side, which method comprises, maintaining a reserve of working medium under a pressure higher than that in said high pressure side; varying the weight of working medium in the circuit to vary the pressure in the high pressure side in relation to the load on the plant, by establishing a flow path for working medium from said reserve to said high pressure side when the power generated in the plant is smaller than the momentary power to be delivered externally, and withdrawing working medium from said high pressure side when the power generated in the plant is greater than the momentary power to be delivered externally; compressing said withdrawn medium to a higher pressure and delivering it to said reserve; and supplying working medium under pressure from an external source to the circuit in relation to the sum of the simultaneous values of high side pressure and pressure on such reserve.

3. The method of regulating the output of a thermal power plant in which a gaseous working medium flows in a closed circuit in which heat is supplied to the working medium from an external source, the heated medium expands through a turbine while doing external work and is then recompressed preparatory to being again heated, whereby the circuit has a high pressure side and a low pressure side, which method comprises, maintaining a reserve of working medium under a pressure higher than that in said high pressure side; varying the weight of working medium in the circuit to vary the pressure in the high pressure side in relation to the load on the plant, by establishing a flow path for working medium from said reserve to said high pressure side when the power generated in the plant is smaller than the momentary power to be delivered externally, and withdrawing working medium from said high pressure side when the power generated in the plant is greater than the momentary power to be delivered externally; compressing said withdrawn medium to a higher pressure and delivering it to said reserve; and supplying working medium under pressure from an external source to the low pressure side of the circuit in relation to the sum of the simultaneous values of high side pressure and pressure on such reserve.

4. The combination of a thermal power plant comprising a heater, a turbine, a turbo compressor and an output machine, the heater, turbine and turbo compressor being connected to form a closed circuit in which a gaseous working medium circulates, and the turbine being arranged to drive the turbo compressor and the output machine; a governor responsive to the load in the output machine; a reservoir for storing working medium at high pressure; flow controlling means arranged to control flow of medium from said reservoir to the circuit at a point of high pressure; compressing means operable to withdraw medium from said circuit at a point of high pressure and deliver it to said reservoir; and means controlled at least in part by said governor and serving to control said flow controlling means and said compressing means.

5. The combination of a thermal power plant comprising a heater, a turbine, a turbo compressor and an output machine, the heater, turbine and turbo compressor being connected to form a closed circuit in which a gaseous working medium circulates, and the turbine being arranged to drive the turbo compressor and the output machine; a governor responsive to the load in the output machine; a reservoir for storing working medium at high pressure; flow controlling means arranged to control flow of medium from said reservoir to the circuit at a point of high pressure; compressing means operable to withdraw medium from said circuit at a point of high pressure and deliver it to said reservoir; and means controlled in part by said governor and in part by the high pressure in the circuit and serving to control said flow controlling means and said compressing means and thus coordinate the high pressure in the circuit with the load.

6. The combination of a thermal power plant comprising a heater, a turbine, a turbo compressor and an output machine, the heater, turbine and turbo compressor being connected to form a closed circuit in which a gaseous working medium circulates, and the turbine being arranged to drive the turbo compressor and the output machine; a governor responsive to the load in the output machine; a reservoir for storing working medium at high pressure; flow controlling means arranged to control flow of medium from said reservoir to the circuit at a point of high pressure; compressing means operable to withdraw medium from said circuit at a point of high pressure and deliver it to said reservoir; a by-pass connecting points in said circuit respectively at high and low pressures; a valve controlling said by-pass; and means controlled at least in part by said governor and serving to control said flow-controlling means, said valve and said compressing means.

7. Thermal power plant, in which a gaseous working medium, preferably air, describes a cycle under pressure above atmospheric, comprising an external combustion source of heat in which heat is supplied to the working medium, a turbine in which the working medium thus heated up is allowed to expand whilst the turbine delivers power externally, a compressor driven by said turbine for compressing the expanded medium again to a higher pressure, governing means influenced by the fluctuations in the output arising in the plant, a by-pass circuit connecting two points of the cycle where different pressures prevail, a valve inserted in said by-pass circuit and influenced in dependency on the load on the plant, a reservoir containing working medium under high pressure, pipes connecting said reservoir to the cycle, a shutting-off device inserted in one of said pipes and operatively connected to said governing means, an auxiliary compressor connected both to a point of the cycle where as high a pressure as possible prevails and to said reservoir, and an auxiliary turbine driving said auxiliary compressor, the current passing through said by-pass circuit driving said auxiliary turbine.

8. Thermal power plant, in which a gaseous working medium, preferably air, describes a cycle under pressure above atmospheric, comprising an external combustion source of heat in which heat is supplied to the working medium, a turbine in which the working medium thus heated up is allowed to expand whilst the turbine delivers power externally, a compressor driven by said turbine for compressing the expanded medium again to a higher pressure, governing means influenced by the fluctuations in the output arising in the plant, a reservoir containing working medium under high pressure, pipes connecting said reservoir to the cycle, a shutting-off device inserted in one of said pipes and operatively connected to said governing means, an auxiliary compressor connected both to a point of the cycle where as high a pressure as possible prevails and to said reservoir, means controlled in part by said governor and in part by pressure in the cycle; a make-up compressor arranged to supply medium from an external source to the cycle at a point where a low pressure prevails; and controlling means for said make-up compressor responsive to the pressure in said reservoir and to the high pressure in said cycle.

FRITZ SALZMANN.